US011256475B2

(12) United States Patent
Ito et al.

(10) Patent No.: US 11,256,475 B2
(45) Date of Patent: Feb. 22, 2022

(54) VEHICLE CONTROL DEVICE AND VEHICLE TRAVEL CONTROL SYSTEM

(71) Applicant: TOYOTA JIDOSHA KABUSHIKI KAISHA, Toyota (JP)

(72) Inventors: Yuki Ito, Iwakura (JP); Tsukasa Nakanishi, Nagoya (JP); Yuta Morikawa, Miyoshi (JP); Naoki Yamamuro, Nagoya (JP); Yuki Tatsumoto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/931,754

(22) Filed: May 14, 2020

(65) Prior Publication Data

US 2021/0011683 A1 Jan. 14, 2021

(30) Foreign Application Priority Data

Jul. 9, 2019 (JP) .............................. JP2019-127877

(51) Int. Cl.
| G06F 3/16 | (2006.01) |
| G01C 21/36 | (2006.01) |
| B60W 60/00 | (2020.01) |
| G05D 1/00 | (2006.01) |

(52) U.S. Cl.
CPC ....... *G06F 3/167* (2013.01); *B60W 60/00139* (2020.02); *G01C 21/3608* (2013.01); *G05D 1/0016* (2013.01); *G05D 1/0022* (2013.01)

(58) Field of Classification Search
CPC . G06F 3/167; G01C 21/3608; G01C 21/3438; G01C 21/3617; B60W 60/00139; B60W 60/001; G05D 1/0022; G05D 1/0016; G05D 1/0038; G05D 2201/0213; G05D 1/0011

See application file for complete search history.

(56) References Cited

U.S. PATENT DOCUMENTS

| 8,036,820 | B2 * | 10/2011 | Sera ................. G08G 1/096866 |
| | | | 701/117 |
| 9,964,948 | B2 | 5/2018 | Ullrich et al. |
| 2010/0223003 | A1 * | 9/2010 | Harada ................ G09B 29/106 |
| | | | 701/533 |
| 2013/0329881 | A1 * | 12/2013 | Fukuma ................ G06Q 10/02 |
| | | | 379/265.12 |
| 2017/0191845 | A1 * | 7/2017 | Marueli ................. G01C 21/20 |
| 2018/0181359 | A1 * | 6/2018 | Monroe ............... G06F 3/0488 |
| 2018/0370365 | A1 * | 12/2018 | Lee ....................... G06F 3/0482 |
| 2019/0250612 | A1 * | 8/2019 | Yamamuro ............ G05D 1/021 |
| 2019/0301879 | A1 * | 10/2019 | Gusikhin ........... G01C 21/3484 |
| 2019/0354111 | A1 * | 11/2019 | Cheng .................. G05D 1/0011 |

(Continued)

*Primary Examiner* — Linda Wong (74) *Attorney, Agent, or Firm* — Oliff PLC (57) ABSTRACT

A vehicle control device including: a remote operation signal reception section configured to be input with a remote operation signal based on an operation by an operator at a command center external to a vehicle; a control section configured to control the vehicle in a remote operation mode, based on the remote operation signal output from the command center, in a state in which remote operation of the vehicle from the command center side has been enabled; and a speech communication device configured to enable conversation between an occupant of the vehicle and an operator at the command center.

7 Claims, 3 Drawing Sheets

(56) References Cited

U.S. PATENT DOCUMENTS

| | | | |
|---|---|---|---|
| 2020/0010051 A1* | 1/2020 | Dumov | B60R 25/252 |
| 2020/0027091 A1* | 1/2020 | Hassani | G06Q 20/40145 |
| 2020/0089968 A1* | 3/2020 | Lu | G01S 17/931 |
| 2020/0200556 A1* | 6/2020 | Boston | G01C 21/3484 |
| 2020/0406914 A1* | 12/2020 | Zhang | B60W 50/14 |

* cited by examiner

VEHICLE CONTROL DEVICE AND VEHICLE TRAVEL CONTROL SYSTEM

CROSS-REFERENCE TO RELATED APPLICATION

This application claims priority under 35 USC 119 from Japanese Patent Application No. 2019-127877, filed on Jul. 9, 2019, the disclosure of which is incorporated by reference herein.

BACKGROUND

Technical Field

The present disclosure relates to a vehicle control device and a vehicle travel control system that control travel.

Related Art

For example, U.S. Pat. No. 9,964,948, discloses a configuration in which vehicle travel control assistance can be received from a control center external to a vehicle when a threshold risk level is reached during autonomous driving in which control of the vehicle during vehicle travel is not dependent on operation by an occupant. However, for example, in cases in which a vehicle travels through a sightseeing area, there may be a desire for the vehicle to travel along a route passing famous sightseeing areas or picturesque spots, instead of traveling along the shortest or fastest route to the destination, even if this means taking a longer route or taking more time.

Regarding this point, in an autonomous driving mode in which vehicle travel is controlled by autonomous driving as described above, it is difficult to freely set a complex route. Moreover, in a manual driving mode in which vehicle travel is controlled by operation of the vehicle by an occupant, the vehicle occupant is unable to take a detour to famous sightseeing areas or picturesque spots without being equipped with information regarding the sightseeing area. By contrast, in a remote operation mode in which the vehicle is remotely operated by an operator at a command center external to the vehicle, the operator is able to freely set a travel route of the vehicle. However, it is difficult for the vehicle occupant to ascertain why the operator has selected a particular travel route, and the vehicle occupant is unable to convey their opinion regarding the travel route selected by the operator.

SUMMARY

The present disclosure provides a vehicle control device and a vehicle travel control system that may enable an occupant of a vehicle to receive an explanation from an operator at a command center, and that may enable the occupant of the vehicle to convey their opinion to the operator at the command center.

A first aspect of the present disclosure is a vehicle control device including: a remote operation signal reception section configured to be input with a remote operation signal based on an operation by an operator at a command center external to a vehicle; a control section configured to control the vehicle in a remote operation mode, based on the remote operation signal output from the command center, in a state in which remote operation of the vehicle from the command center side has been enabled; and a speech communication device configured to enable conversation between an occupant of the vehicle and an operator at the command center.

In the vehicle control device of the first aspect, the remote operation signal based on an operation by the operator at the command center is output from the command center, and this remote operation signal is received by the remote operation signal reception section at the vehicle side. In a state in which remote operation of the vehicle from the command center external to the vehicle has been enabled, when the remote operation control signal is received by the remote operation signal reception section on the vehicle side, the control section controls the vehicle based on the remote operation signal. Accordingly, in this state, the vehicle is remotely operated by the operator at the command center.

In this vehicle control device, the occupant of the vehicle and the operator at the command center are able to converse with each other using the speech communication device. Accordingly, for example, the operator at the command center is able to suggest a recommended route (travel path) to the destination, and the occupant of the vehicle is able to convey their opinion regarding the suggestion of the operator at the command center.

A second aspect of the present disclosure, in the first aspect, may further include: a destination input section configured to enable input of a destination; and a position information input section configured to be input with position information regarding a current position of the vehicle, wherein the control section may be configured to control the vehicle in the remote operation mode when a current location of the vehicle has entered a predetermined range including the destination based on the position information input to the position information input section.

In the vehicle control device of the second aspect, the position information input section is input with position information, and, based on the position information, when the current location of the vehicle (own vehicle) has entered the predetermined range including the destination that has been input to the destination input section, the vehicle is controlled by the control section in the remote operation mode.

A third aspect of the present disclosure, in the second aspect, may further include: a situation detection device configured to detect a situation around the vehicle and to output a situation detection signal based on a detection result, wherein the control section may be configured to control the vehicle based on the situation detection signal, and wherein the control section may control the vehicle based on the situation detection signal for at least a partial journey segment including the predetermined range on a path to the destination.

In the vehicle control device of the third aspect, the situation around the vehicle is detected by the situation detection device. Detection results of the situation detection device regarding the situation around the vehicle are output from the situation detection device as the situation detection signal. The situation detection signal output from the situation detection device is input into the control section.

The control section controls the vehicle based on the situation detection signal output from the situation detection device for at least a partial journey segment including the predetermined range (the predetermined range including the destination) on a path to the destination.

A fourth aspect of the present disclosure is a vehicle travel control system including: a command center located externally to a vehicle, the command center including a controller configured to be operated by an operator, and to output a remote operation signal based on operation of the controller by the operator; a vehicle control device installed in the vehicle, the vehicle control device configured to control travel of the vehicle based on operation of the controller by the operator by being input with the remote operation signal in a state in which remote operation of the vehicle has been enabled; and a speech communication device configured to enable conversation between an occupant of the vehicle and an operator at the command center.

In the vehicle travel control system of the fourth aspect, the command center is located externally to the vehicle, and when the controller at the command center is operated by an operator at the command center, a remote operation signal based on the operation of the controller is output from the command center. When the remote operation signal is input to the vehicle control device at the vehicle side in a state in which remote operation of the vehicle is enabled, the vehicle control device controls the vehicle based on the remote operation signal. Accordingly, in this state the vehicle is remotely operated by the operator at the command center.

In the vehicle travel control system of the fourth aspect, the occupant of the vehicle and the operator at the command center are able to converse with each other using the speech communication device. Accordingly, for example, the operator at the command center is able to suggest a recommended route (travel path) to the destination, and the occupant of the vehicle is able to convey their opinion regarding the suggestion of the operator at the command center.

As described above, in the vehicle control device of the first aspect of the present disclosure, the occupant of the vehicle and an operator at the command center are able to converse using the speech communication device. Accordingly, the vehicle control device of the first aspect may enable the operator at the command center to suggest travel routes and the like to the occupant of the vehicle, and the occupant of the vehicle is able to convey their opinion regarding the suggestion from the operator.

In the vehicle control device of the second aspect of the present disclosure, when entering the predetermined range including the destination, the vehicle is controlled by the control section in the remote operation mode. Namely, control of the vehicle by the operator at the command center starts after the vehicle has entered the predetermined range. Accordingly, until the vehicle enters the predetermined range including the destination, the vehicle may travel in a different mode to the remote operation mode, for example in a manual driving mode operated by the occupant of the vehicle, an autonomous driving mode in which the situation around the vehicle is detected and the control section controls the vehicle, or in a remote operation mode under the control of an operator at another command center.

In the vehicle control device of the third aspect of the present disclosure, the occupant of the vehicle may not need to perform any particular control of the vehicle for at least the partial journey segment including the predetermined range (the predetermined range including the destination).

In the vehicle travel control system of the fourth aspect of the present disclosure, the occupant of the vehicle and an operator at the command center are able to converse using the speech communication device. Accordingly, the vehicle travel control system of the fourth aspect may enable the operator at the command center to suggest travel routes and the like to the occupant of the vehicle, and the occupant of the vehicle is able to convey their opinion regarding the suggestion from the operator.

BRIEF DESCRIPTION OF THE DRAWINGS

Exemplary embodiments will be described in detail based on the following figures, wherein.

DETAILED DESCRIPTION

Figure 1:
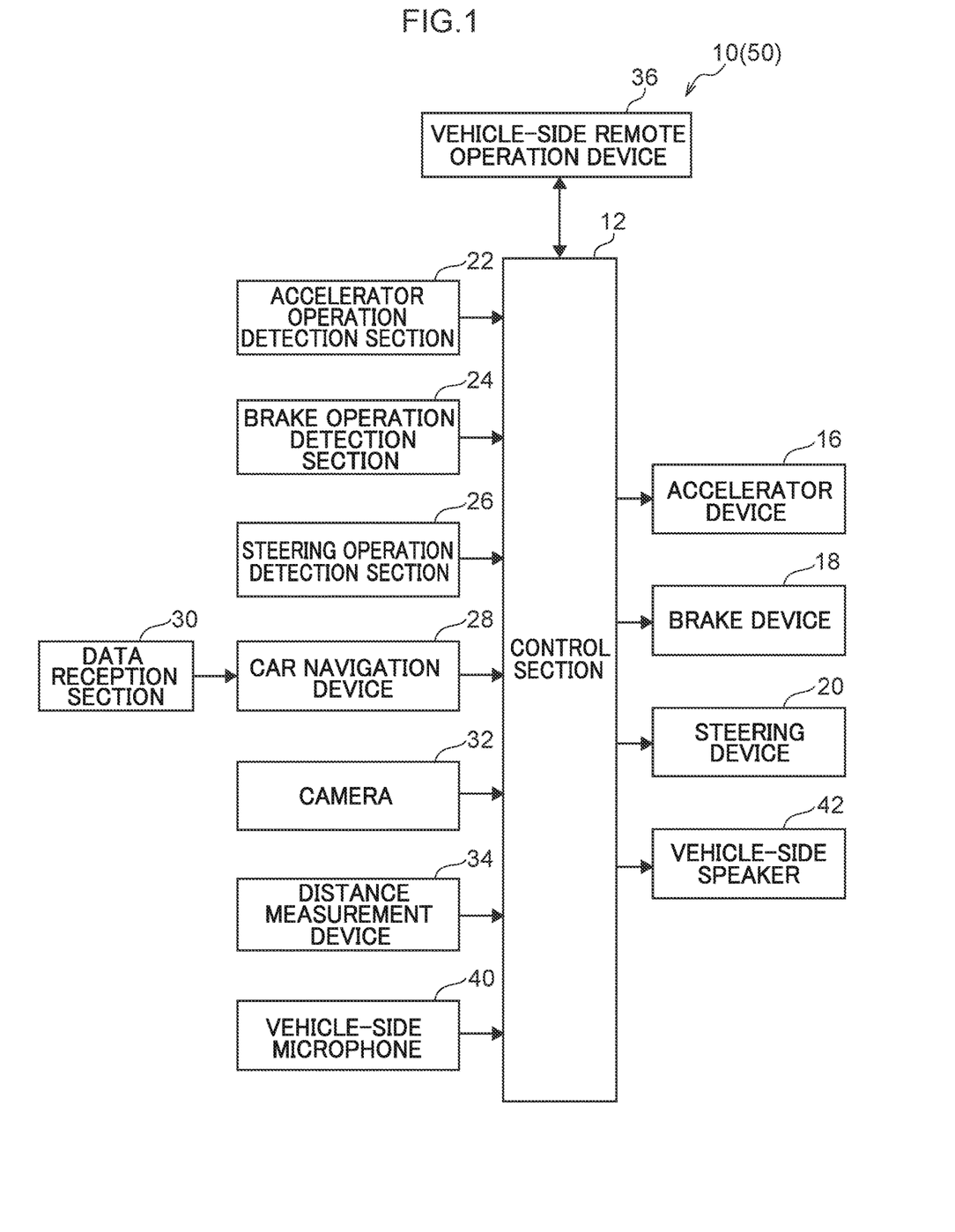
FIG. 1 is a block diagram of a vehicle control device according to an exemplary embodiment of the present disclosure.
Figure 2:
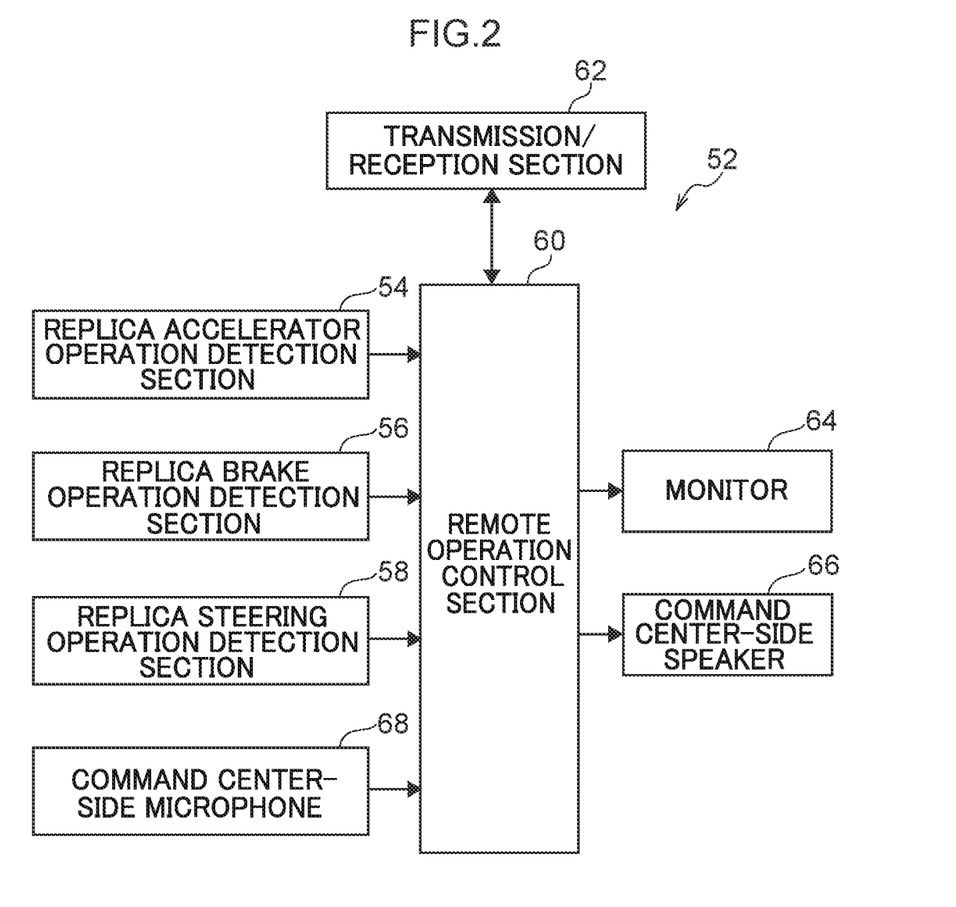
FIG. 2 is a block diagram of a controller at a command center according to an exemplary embodiment of the present disclosure.
Figure 3:
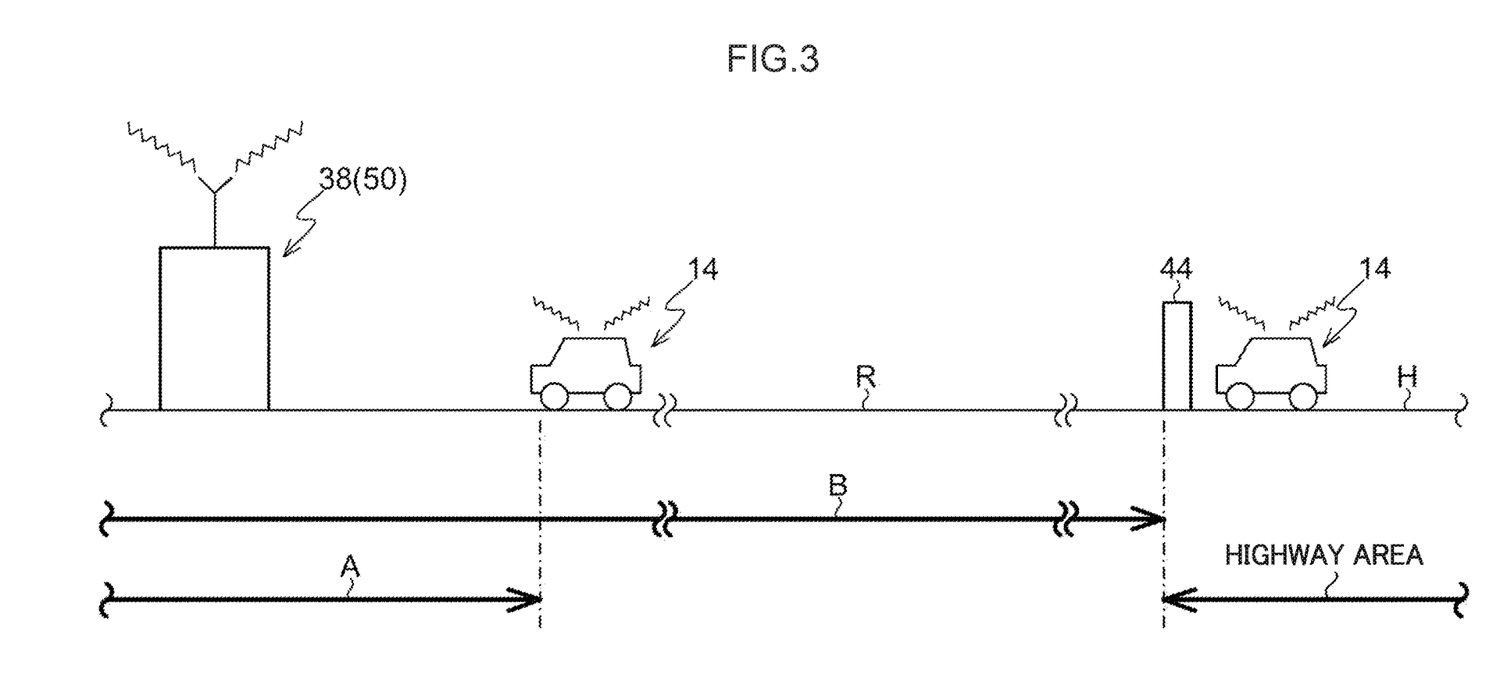
FIG. 3 is a side view schematically illustrating a travel route to a destination.

Explanation follows regarding an exemplary embodiment of the present disclosure, with reference to FIG. 1 to FIG. 3.

As illustrated in FIG. 1, a vehicle control device 10 includes a control section 12. The control section 12 is electrically connected to travel operation devices, such as an accelerator device 16, a brake device 18, and a steering device 20, of a vehicle 14 (not illustrated in FIG. 1; see FIG. 3).

In cases in which the vehicle 14 is an electric vehicle or the like that utilizes electric power as drive energy, the accelerator device 16 is electrically connected to a drive motor installed in the vehicle 14. The drive motor is mechanically coupled to drive wheels of the vehicle 14. The accelerator device 16 controls electric power supply to the drive motor based on a signal level of an accelerator control signal output by the control section 12. Rotation of the drive wheels of the vehicle 14 is thereby controlled based on the signal level of the accelerator control signal output by the control section 12, and the vehicle 14 travels at a speed or an accelerates at a rate based on the signal level of the accelerator control signal.

In cases in which the vehicle 14 is a vehicle with an engine fueled by gasoline or the like, the accelerator device 16 is electrically connected to a drive section that operates a throttle valve to adjust a rate of airflow into the engine. The drive section drives the throttle valve based on the signal level of the accelerator control signal. The vehicle 14 thereby travels at a speed or accelerates at a rate based on the signal level of the accelerator control signal.

The brake device 18 includes a brake drive section that is driven by being supplied with power. The brake drive section is for example configured by an electric motor. A drive direction and a drive speed of the brake drive section are controlled based on a signal level of a brake control signal output by the control section 12. When the brake drive section is driven forward, brake pads or brake shoes of a mechanical brake system configuring the vehicle 14 are pressed against wheels of the vehicle 14 to reduce the rotation speed of the wheels accordingly. In contrast thereto, when the brake drive section is driven in reverse, the pressing of the brake pads or brake shoes against the wheels is relaxed. The reduction in the rotation speed of the wheels is thereby slowed, or no further reduction in the speed of the wheels occurs.

The steering device 20 includes a steering drive section that is driven by being supplied with power. The steering drive section is, for example, configured by an electric motor. A drive direction and a drive speed of the steering drive section are controlled based on a signal level of a steering control signal output by the control section 12.

The steering drive section is mechanically coupled to a king pin supporting at least one set of wheels out of front wheels or rear wheels of the vehicle 14 through a mechanical transmission mechanism including a rack, a pinion, and a tie-rod. When the steering drive section is driven, drive force output by the steering drive section is transmitted to the king pin through the mechanical transmission mechanism. Either the front wheels or the rear wheels of the vehicle 14 are thereby pivoted in a direction about an axis with its axial direction along a vehicle vertical direction to alter the direction of progress of the vehicle 14.

The vehicle 14 also includes an accelerator pedal. The accelerator pedal is provided at the vehicle lower front side of a driver seat inside the cabin of the vehicle 14, and is capable of pivoting in directions about an axis with its axial direction along a vehicle width direction. When a pedal portion of the accelerator pedal is depressed by an occupant seated in the driver seat of the vehicle 14, the pedal portion of the accelerator pedal pivots toward the vehicle lower side according to the magnitude of the depressing force applied by the occupant. A pivot angle and pivot speed of the accelerator pedal are detected by a sensor configuring an accelerator operation detection section 22 illustrated in FIG. 1.

The accelerator operation detection section 22 outputs an accelerator operation signal at a level corresponding to the respective values of the pivot angle and pivot speed of the accelerator pedal. The accelerator operation signal output by the accelerator operation detection section 22 is input to the control section 12. In a state in which a travel control mode of the vehicle 14 is a manual driving mode, the control section 12 outputs an accelerator control signal corresponding to the level of the input accelerator operation signal. Thus, when in the manual driving mode, for example, the travel speed and acceleration rate (including the deceleration rate) of the vehicle 14 are set according to the pivot angle and pivot speed of the accelerator pedal depressed by the occupant.

The vehicle 14 also includes a brake pedal. The brake pedal is provided at the vehicle lower front side of the driver seat inside the cabin of the vehicle 14, and is capable of pivoting in directions about an axis with its axial direction along the vehicle width direction. When a pedal portion of the brake pedal is depressed by the occupant seated in the driver seat of the vehicle 14, the pedal portion of the brake pedal pivots toward the vehicle lower front side according to the magnitude of the depressing force applied by the occupant. A pivot angle and pivot speed of the brake pedal are detected by a sensor configuring a brake operation detection section 24 illustrated in FIG. 1.

The brake operation detection section 24 outputs a brake operation signal at a level corresponding to the respective values of the pivot angle and pivot speed of the brake pedal. The brake operation signal output by the brake operation detection section 24 is input to the control section 12. In a state in which the travel control mode of the vehicle 14 is the manual driving mode, the control section 12 outputs a brake control signal corresponding to the level of the input brake operation signal. Thus, when in the manual driving mode, for example, the vehicle 14 decelerates according to the pivot angle and pivot speed of the brake pedal depressed by the occupant.

The vehicle 14 also includes a steering wheel. The steering wheel is provided at the vehicle front side of the driver seat inside the cabin of the vehicle 14, and is capable of rotating toward the left and right about an axis with its axial direction along a vehicle front-rear direction. The steering wheel can be rotation-operated by the occupant of the driver seat of the vehicle 14. A rotation angle of the steering wheel is detected by a sensor configuring the steering operation detection section 26 illustrated in FIG. 1.

The steering operation detection section 26 outputs a steering operation signal at a level corresponding to the rotation angle of the steering wheel. The steering operation signal output by the steering operation detection section 26 is input to the control section 12. In a state in which the travel control mode of the vehicle 14 is the manual driving mode, the control section 12 outputs a steering control signal corresponding to the level of the input steering operation signal. Thus, when in the manual driving mode, for example, the vehicle 14 is steered according to the rotation angle of the steering wheel rotation-operated by the occupant.

The control section 12 is electrically connected to a car navigation device 28 serving as a positioning signal reception section, this being an example of a destination input section and a position information input section. The control section 12 is capable of accessing a control section of the car navigation device 28, this being separate from the control section 12. The control section 12 is thereby able to read information read by a control section of the car navigation device 28 and information stored in the car navigation device 28.

The car navigation device 28 includes an antenna. Positioning signals (electromagnetic waves), these being an example of position information output by artificial satellites configuring a positioning system, are received by the antenna of the car navigation device 28. The car navigation device 28 computes the latitude and longitude of the current location of the vehicle 14 from the received positioning signals, and is capable of displaying the current location of the vehicle 14 on a map displayed on a monitor inside the cabin of the vehicle 14. The car navigation device 28 also includes an input device, and is for example capable of finding and setting a route from a departure point to a destination in response to operation of the input device by the occupant. The car navigation device 28 is also electrically connected to a data reception section 30, this being an example of a situation detection device.

The data reception section 30 includes an antenna that is capable of receiving data signals, and is specifically capable of receiving data signals sent from a service provider. Data signals such as road information (such road speed limits and traffic information) and weather information for the departure point and destination, as well as en-route to the destination, are transmitted from the service provider. When data signals are input to the data reception section 30, the data signals are input to the control section of the car navigation device 28, and are also input to the control section 12 through the car navigation device 28.

The control section 12 is also electrically connected to a camera 32 serving as a vehicle surroundings imaging device configuring a vehicle surroundings monitoring device, this being an example of a situation detection device. The camera 32 images the surroundings of the vehicle 14 (for example ahead of the vehicle 14). Video images (images) imaged by the camera 32 are converted into an image information signal and input to the control section 12. The control section 12 analyzes the situation around the vehicle 14, such as the road width ahead of the vehicle 14, changes in traffic signals, and the states of other vehicles, pedestrians, and so on ahead of the vehicle 14, based on the input image information signal.

The control section 12 is also electrically connected to a distance measurement device 34 configuring the vehicle surroundings monitoring device, this being an example of the situation detection device, together with the camera 32. The distance measurement device 34 includes a detection wave output section and a detection wave reception section. Detection waves are output ahead of the vehicle 14 and so on from the detection wave output section of the distance measurement device 34. The detection waves are for example electromagnetic waves such as infrared light or laser beams, and are reflected by obstacles ahead of the vehicle 14. When the reflected detection waves are received by the detection wave reception section of the distance measurement device 34, distances from the vehicle 14 to obstacles and so on are computed by the distance measurement device 34, and a forward monitoring signal is output by the distance measurement device 34 based on the computation result. The forward monitoring signal output by the distance measurement device 34 is input to the control section 12.

The vehicle 14 installed with the vehicle control device 10 is capable of performing an autonomous travel operation in an autonomous driving mode, this being one example of a travel control mode. When in the autonomous driving mode, accelerator operation signals, brake operation signals, and steering operation signals are output by the control section 12 as appropriate based on signals output by the car navigation device 28, the camera 32, the distance measurement device 34, and so on described above. Travel of the vehicle 14 is thereby controlled without depending on operation by the occupant of the vehicle 14, thereby enabling the vehicle 14 to travel toward the destination or the like without requiring any particular operation by the occupant.

The control section 12 is also electrically connected to a vehicle-side remote operation device 36, serving as a remote operation signal reception section. The vehicle-side remote operation device 36 is capable of intercommunicating with a command center 38 (see FIG. 3) that configures a vehicle travel control system 50 together with the vehicle control device 10. Respective command centers 38 are set within ranges that each include a specific region, such as a sightseeing area, a residential area, or a multistory parking lot, so as to oversee this specific region. A controller 52 is located at the command center 38. The controller 52 is for example built to simulate the driver seat of a typical vehicle, and includes a replica driver seat in which an operator (remote operator) sits. The controller 52 also includes a replica accelerator pedal, a replica brake pedal, and a replica steering wheel.

The replica accelerator pedal is provided at the lower front side of the replica driver seat of the controller 52, and is capable of pivoting in directions about an axis with its axial direction along a left-right direction. When a pedal portion of the replica accelerator pedal is depressed by the operator seated in the replica driver seat, the pedal portion of the replica accelerator pedal pivots toward the lower side according to the magnitude of the depressing force applied by the operator. A pivot angle and pivot speed of the replica accelerator pedal are detected by a sensor configuring a replica accelerator operation detection section 54 illustrated in FIG. 2. The replica accelerator operation detection section 54 outputs a replica accelerator operation signal at a level corresponding to the respective values of the pivot angle and pivot speed of the replica accelerator pedal.

The replica brake pedal is provided at the lower front side of the replica driver seat of the controller 52, and is capable of pivoting in directions about an axis with its axial direction along the left-right direction. When a pedal portion of the replica brake pedal is depressed by the operator seated in the replica driver seat of the controller 52, the pedal portion of the replica brake pedal pivots toward the lower front side according to the magnitude of the depressing force applied by the operator. A pivot angle and pivot speed of the replica brake pedal are detected by a sensor configuring a replica brake operation detection section 56 illustrated in FIG. 2. The replica brake operation detection section 56 outputs a replica brake operation signal at a level corresponding to the respective values of the pivot angle and pivot speed of the replica brake pedal.

The replica steering wheel is provided at the front side of the replica driver seat of the controller 52, and is capable of rotating toward the left and right about an axis with its axial direction along a front-rear direction. The replica steering wheel can be rotation-operated by the operator seated in the replica driver seat. A rotation angle of the replica steering wheel is detected by a sensor configuring a replica steering operation detection section 58 illustrated in FIG. 2. The replica steering operation detection section 58 outputs a replica steering operation signal at a level corresponding to the rotation angle of the replica steering wheel.

The controller 52 also includes a remote operation control section 60. The remote operation control section 60 is electrically connected to the replica accelerator operation detection section 54, the replica brake operation detection section 56, and the replica steering operation detection section 58 described above, and the replica accelerator operation signal, the replica brake operation signal, and the replica steering operation signal are each input to the remote operation control section 60. The remote operation control section 60 generates a remote operation signal based on the input replica accelerator operation signal, the replica brake operation signal, and the replica steering operation signal. The remote operation control section 60 is electrically connected to a transmission/reception section 62. The remote operation signal generated by the remote operation control section 60 is converted to electromagnetic waves by the transmission/reception section 62 and transmitted from an antenna of the command center 38.

In a remote operation mode, this being an example of a travel control mode, when electromagnetic waves transmitted from the antenna of the command center 38 based on the remote operation signal are received by the vehicle-side remote operation device 36 of the vehicle 14, the remote operation signal is input to the control section 12. When the remote operation signal is input to the control section 12, an accelerator operation signal, a brake operation signal, a steering operation signal, and so on are output by the control section 12 based on the remote operation signal. The vehicle 14 is thereby remotely operated based on operation of the controller 52 by the operator at the command center 38.

The controller 52 includes a monitor 64. In a state in which the control section 12 of the vehicle control device 10 and the controller 52 of the command center 38 are intercommunicating, a video image signal based on a video image captured by the camera 32 described above is output as electromagnetic waves from the vehicle-side remote operation device 36 through the remote operation control section 60. When the video image signal output by the vehicle-side remote operation device 36 is received by the command center 38 and input to the transmission/reception section 62, a video image of the surroundings of the vehicle 14 is displayed on the monitor 64 based on the video image signal. The operator seated in the replica driver seat of the controller 52 is thereby able to see the situation surrounding the vehicle 14.

The control section 12 of the vehicle control device 10 is connected to a vehicle-side microphone 40, configuring a speech communication device. The vehicle-side microphone 40 enables input of audio from inside the cabin of the vehicle 14, such that for example the voice of the occupant of the vehicle 14 is input to the vehicle-side microphone 40. When audio is input to the vehicle-side microphone 40, the audio is converted to a vehicle-side audio signal, this being an electrical signal corresponding to the audio. In a state in which the vehicle 14 and the command center 38 are intercommunicating, the vehicle-side audio signal is input to the vehicle-side remote operation device 36 through the control section 12, and electromagnetic waves corresponding to the vehicle-side audio signal are output by the vehicle-side remote operation device 36.

A command center-side speaker 66 configuring a speech communication device is installed in the command center 38. When the command center 38 receives the electromagnetic waves corresponding to the vehicle-side audio signal, the vehicle-side audio signal is converted to audio and output from the command center-side speaker 66. The operator at the command center 38 is thereby able to listen to audio from the occupant of the vehicle 14.

The control section 12 of the vehicle control device 10 is connected to a vehicle-side speaker 42 configuring a speech communication device. The vehicle-side speaker 42 is connected to the vehicle-side remote operation device 36 through the control section 12. When electromagnetic waves corresponding to an external audio signal are received by the vehicle-side remote operation device 36, audio is output by the vehicle-side speaker 42 based on the external audio signal, and the occupant of the vehicle 14 is able to listen to the audio output by the vehicle-side speaker 42.

A command center-side microphone 68 configuring a speech communication device is installed in the command center 38. When audio from the operator at the command center 38 is input to the command center-side microphone 68, the audio is converted to an external audio signal, and electromagnetic waves corresponding to the external audio signal are output by the command center 38. When the electromagnetic waves output by the command center 38 corresponding to the external audio signal are received by the vehicle-side remote operation device 36, the occupant of the vehicle 14 is able to listen to the audio from the operator at the command center 38. Namely, by employing both the vehicle-side microphone 40 and the vehicle-side speaker 42, the occupant of the vehicle 14 is able to converse with the operator at the command center 38.

The above-described remote operation of the vehicle 14 by the operator at the command center 38 is for example enabled by applying in advance through a travel agency or the like.

In the vehicle 14 installed with the vehicle control device 10 with the above configuration, the occupant of the vehicle 14 selects any one travel control mode out of the manual driving mode, the autonomous driving mode, or the remote operation mode described above. Specifically, for example, when an ignition device of the vehicle 14 is operated by the occupant of the vehicle 14 and the vehicle 14 is ready to travel, the control section 12 displays a travel control mode selection screen on a monitor of the car navigation device 28. In this state, any one travel control mode out of the manual driving mode, the autonomous driving mode, or the remote operation mode is selected by operation of a touch panel or another input device provided to the monitor of the car navigation device 28.

When switching modes between the manual driving mode or the autonomous driving mode and the remote operation mode, the vehicle 14 and the command center 38 are placed in an intercommunicating state, and switching is achieved by transferring authority over travel operation control of the vehicle 14 from one out of the vehicle 14 or the command center 38 to the other.

Explanation follows regarding operation of the present exemplary embodiment, with reference to a model in which a highway H (see FIG. 3) is used on a course from a departure point to a destination as an example. In this model, the vehicle 14 is controlled in the manual driving mode as far as the nearest interchange of the highway H to the departure point, and then controlled in the autonomous driving mode on the highway H. The vehicle 14 is then controlled in the remote operation mode from the nearest interchange of the highway H to the destination.

At the departure point (such as the residential parking lot of the occupant of the vehicle 14), the occupant of the vehicle 14 inputs the car navigation device 28 with a destination and waypoints and so on between the departure point and the destination. The occupant of the vehicle 14 also selects the travel control mode of the vehicle 14 in this state. In the present exemplary embodiment, the manual driving mode is selected initially, and so travel of the vehicle 14 begins in a manual driving mode state.

In this state, accelerator operation signals, brake operation signals, and steering operation signals are input to the control section 12 based on accelerator operations, brake operations, and steering operations by the occupant of the vehicle 14. Accelerator control signals, brake control signals, and steering control signals are output from the control section 12 based on the accelerator operation signals, brake operation signals, and steering operation signals input to the control section 12. The accelerator device 16, the brake device 18, and the steering device 20 of the vehicle 14 are respectively operated based on the accelerator control signals, the brake control signals, and the steering control signals output from the control section 12. Travel of the vehicle 14 in the manual driving mode is thereby controlled in response to operation by the occupant of the vehicle 14.

When the vehicle 14 arrives at the nearest interchange of the highway H to the departure point, the occupant of the vehicle 14 switches the travel control mode of the vehicle 14 from the manual driving mode to the autonomous driving mode. In this state, accelerator operation signals, brake operation signals, and steering operation signals are output from the control section 12 as appropriate based on road information and weather information received by the data reception section 30, video images of the surroundings of the vehicle 14 captured by the camera 32, the distances from the vehicle 14 to obstacles and the like as measured by the distance measurement device 34, and so on. Thus, in a state in which the vehicle 14 is traveling along the highway H, the vehicle 14 is able to travel without depending on operation by the occupant.

Note that electromagnetic waves are output from the command center 38 that oversees an area A (see FIG. 3) including the destination. The electromagnetic waves output from the command center 38 can be received in the area A and also in an area B (see FIG. 3) including the nearest interchange of the highway H to the destination of the vehicle 14. Thus, when the vehicle 14 passes a toll gate 44 at the nearest interchange of the highway H to the destination, the electromagnetic waves from the command center 38 are received by the vehicle-side remote operation device 36 of the vehicle 14.

An intercommunicating state between the vehicle 14 and the command center 38 is thereby established. Conversation between the occupant of the vehicle 14 and an operator at the command center 38 is possible in this state. When authority over travel operation control is transferred from the vehicle 14 to the command center 38 in this state, the vehicle 14 switches from the autonomous driving mode to the remote operation mode to travel along a general road R (see FIG. 3).

In this state, the operator at the command center 38 operates the controller 52 located at the command center 38 based on video images captured by the camera 32 of the vehicle 14 and so on. Remote operation signals are output from the command center 38 based on this operation of the controller 52 at the command center 38. When the remote operation signals output from the command center 38 are received by the vehicle-side remote operation device 36 of the vehicle 14 and these remote operation signals are input to the control section 12, accelerator operation signals, brake operation signals, steering operation signals, and so on are output from the control section 12 based on the remote operation signals. The vehicle 14 is thereby remotely operated based on the operation of the controller 52 by the operator at the command center 38.

In this state, since the vehicle 14 is remotely operated by the operator at the command center 38, the operator at the command center 38 is capable of freely selecting a route other than the shortest route to the destination or the easiest route with the widest roads, for example. Moreover, in this state, the occupant of the vehicle 14 and the operator at the command center 38 can converse with each other through the vehicle-side microphone 40, the command center-side speaker 66, the command center-side microphone 68, and the vehicle-side speaker 42.

Thus, in this state, for example, the operator at the command center 38 is able to ascertain the interests and preferences of the occupant of the vehicle 14 based on the conversation between the occupant of the vehicle 14 and the operator at the command center 38, and change the destination or the route to the destination as appropriate. Moreover, the operator at the command center 38 is able to suggest a change to the destination or the route to the destination to the occupant of the vehicle 14, and the occupant of the vehicle 14 is able to convey their opinion regarding the suggestion of the operator at the command center 38. Thus, for example, with the agreement of the occupant of the vehicle 14, a detour from the shortest route to the destination may be made in order to stop off at a scenic location. Moreover, for example, the occupant of the vehicle 14 is able to listen to local information such as sightseeing information on the way to the destination from the operator at the command center 38, and may stop off at a sightseeing area, a restaurant, or the like based on this local information.

In this manner, the present exemplary embodiment enables guidance to be provided regarding the destination and its surroundings, etc. according to the interests and preferences of the occupant of the vehicle 14, and the destination or the route taken to the destination may be changed based on this guidance.

Note that in the present exemplary embodiment, the operator at the command center 38 handles both the remote operation of the vehicle 14 and conversation with the occupant of the vehicle 14. However, a separate operator (guide) may be appointed to converse with the occupant of the vehicle 14 in addition to the operator responsible for the remote operation of the vehicle 14.

Moreover, in the model of the present exemplary embodiment, the travel control mode of the vehicle 14 from the departure point to the nearest interchange of the highway H to the departure point is set to the manual driving mode. However, the travel control mode of the vehicle 14 from the departure point to the nearest interchange of the highway H to the departure point may be set to the autonomous driving mode, or may be set to the remote operation mode under the control of an operator at another command center that oversees a range including the departure point and the nearest interchange of the highway H to the departure point.

Furthermore, in the model of the present exemplary embodiment, the travel control mode of the vehicle 14 on the highway H is set to the autonomous driving mode. However, the travel control mode of the vehicle 14 on the highway H may be set to the manual driving mode, or may be set to the remote operation mode under the control of an operator at another command center that oversees the highway H.

Moreover, in the model of the present exemplary embodiment, the vehicle 14 travels along the highway H. However, the present exemplary embodiment may also be applied to a case in which the vehicle 14 does not travel along a highway H, limited-access road, or the like. Namely, for example, authority over travel operation control may be transferred from the vehicle 14 to the command center 38 in cases in which the vehicle 14 has reached an area including a destination on a general road, or a switchover area set outside such an area.

Furthermore, in the present exemplary embodiment, conversation between the occupant of the vehicle 14 and the operator at the command center 38 is enabled by switching to the remote operation mode in order to establish the intercommunicating state between the vehicle 14 and the command center 38. However, a configuration may be applied in which conversation between the occupant of the vehicle 14 and the operator at the command center 38 is enabled prior to switching to the remote operation mode. In such a configuration, communication in the form of conversation between the occupant of the vehicle 14 and the operator at the command center 38 is enabled at an earlier stage.

Moreover, in the present exemplary embodiment, control of the vehicle 14 is set to the remote operation mode from the nearest interchange of the highway H to the destination. However, for example, the vehicle 14 may be remotely operated by the operator at the command center 38 from the departure point onward. In such cases, communication in the form of conversation between the occupant of the vehicle 14 and the operator at the command center 38 is enabled at an earlier stage.

Furthermore, reference to the "destination" in the above explanation is not limited to a specific location such as a station or hotel building or a specific intersection, and may refer to a predetermined region (such as the Kyoto area, or the Roppongi neighborhood of Tokyo).

Moreover, in the present exemplary embodiment, the controller 52 located at the command center 38 simulates the driver seat of a typical vehicle. However, as long as the controller 52 can be operated to control travel of the vehicle 14, there is no limitation to any particular configuration, and a wide range of configurations may be applied therefor.

Further, in the present exemplary embodiment, the command center 38 is set within a range including a specific region so as to oversee the specific region. However, as long as the command center 38 is capable of remotely operating a vehicle 14 that has entered the specific region using the controller 52, the command center 38 may be located in a region not within the range including the specific region.

What is claimed is:
1. A vehicle control device comprising:
 a remote operation signal reception section configured to be input with a remote operation signal based on an operation by an operator at a command center external to a vehicle;

a control section configured to:
  control the vehicle in a manual driving mode in which the control section outputs control signals for controlling the vehicle in response to manual operation of actuators arranged in a cabin of the vehicle,
  control the vehicle in an autonomous driving mode in which the control section outputs control signals for controlling the vehicle based on input from at least one sensor, and
  control the vehicle in a remote operation mode, based on the remote operation signal output from the command center, in a state in which the command center is configured to remotely operate the vehicle from the command center, and
  switch between the manual driving mode, the autonomous driving mode, and the remote operation mode, based on a selection from an occupant of the vehicle;
a speech communication device configured to enable conversation between the occupant of the vehicle and an operator at the command center, and
a navigation device communicatively connected to the control section, the navigation device being configured to (i) acquire a current location of the vehicle and (ii) receive a destination and a route to the destination based on an operation by the occupant of the vehicle,
wherein the control section is configured to control the speech communication device so as to enable conversation between the occupant of the vehicle and the operator at the command center when the current location of the vehicle enters a predetermined section of a road, the predetermined section including the destination, and
wherein, in the remote operation mode, the remote operation signal reception section receives, from the operator at the command center, (i) local information including sightseeing information on a way to the destination, and (ii) an instruction to change the destination or the route to the destination if agreement from the occupant of the vehicle is provided.

2. The vehicle control device of claim 1, wherein
the sensor is configured to detect a situation around the vehicle and to output a situation detection signal based on a detection result,
the control section is configured to control the vehicle based on the situation detection signal, and
the control section controls the vehicle based on the situation detection signal for at least a partial journey segment on a path to the destination.

3. A vehicle travel control system comprising:
a command center located externally to a vehicle, the command center including a controller configured to be operated by an operator, and to output a remote operation signal based on operation of the controller by the operator;
a vehicle control device installed in the vehicle, the vehicle control device being configured to:
  control the vehicle in a manual driving mode in which the vehicle control device outputs control signals for controlling the vehicle in response to manual operation of actuators arranged in a cabin of the vehicle,
  control the vehicle in an autonomous driving mode in which the vehicle control device outputs control signals for controlling the vehicle based on input from at least one sensor,
  control the vehicle in a remote operation mode, based on operation of the controller by the operator by being input with the remote operation signal in a state in which the command center is configured to remotely operate the vehicle; and
  switch between the manual driving mode, the autonomous driving mode, and the remote operation mode, based on a selection from an occupant of the vehicle;
a speech communication device configured to enable conversation between the occupant of the vehicle and an operator at the command center, and
a navigation device communicatively connected to the vehicle control device, the navigation device being configured to (i) acquire a current location of the vehicle and (ii) receive a destination and a route to the destination based on an operation by the occupant of the vehicle,
wherein the vehicle control device is configured to control the speech communication device so as to enable conversation between the occupant of the vehicle and the operator at the command center when the current location of the vehicle enters a predetermined section of a road, the predetermined section including the destination, and
wherein, in the remote operation mode, the command center transmits, to the occupant of the vehicle, local information including sightseeing information on a way to the destination, and the command center changes the destination or the route to the destination if agreement from the occupant of the vehicle is provided.

4. A vehicle control device comprising:
an antenna configured to be input with a remote operation signal based on an operation by an operator at a command center external to a vehicle;
a processor programmed to:
  control the vehicle in a manual driving mode in which the processor outputs control signals for controlling the vehicle in response to manual operation of actuators arranged in a cabin of the vehicle,
  control the vehicle in an autonomous driving mode in which the processor outputs control signals for controlling the vehicle based on input from at least one sensor,
  control the vehicle in a remote operation mode, based on the remote operation signal output from the command center, in a state in which the command center is configured to remotely operate the vehicle from the command center, and
  switch between the manual driving mode, the autonomous driving mode, and the remote operation mode, based on a selection from an occupant of the vehicle;
a microphone and a speaker arranged in the vehicle that are configured to enable conversation between the occupant of the vehicle and an operator at the command center, and
a navigation device communicatively connected to the processor, the navigation device being configured to (i) acquire a current location of the vehicle and (ii) receive a destination and a route to the destination based on an operation by the occupant of the vehicle,
wherein the processor is programmed to control the microphone and the speaker so as to enable conversation between the occupant of the vehicle and the operator at the command center when the current location of the vehicle enters a predetermined section of a road, the predetermined section including the destination, and
wherein, in the remote operation mode, the antenna receives, from the operator at the command center, (i) local information including sightseeing information on a way to the destination, and (ii) an instruction to change the destination or the route to the destination if agreement from the occupant of the vehicle is provided.

5. The vehicle control device of claim 1, wherein the speech communication device is configured to enable conversation between the occupant of the vehicle and a guide who is different from the operator at the command center.

6. The vehicle travel control system of claim 3, wherein the speech communication device is configured to enable conversation between the occupant of the vehicle and a guide who is different from the operator at the command center.

7. The vehicle control device of claim 4, wherein the microphone and the speaker are configured to enable conversation between the occupant of the vehicle and a guide who is different from the operator at the command center.

* * * * *